July 27, 1954
J. ROTHSTEIN
2,684,593
PRESSURE GAUGE
Filed Dec. 14, 1950
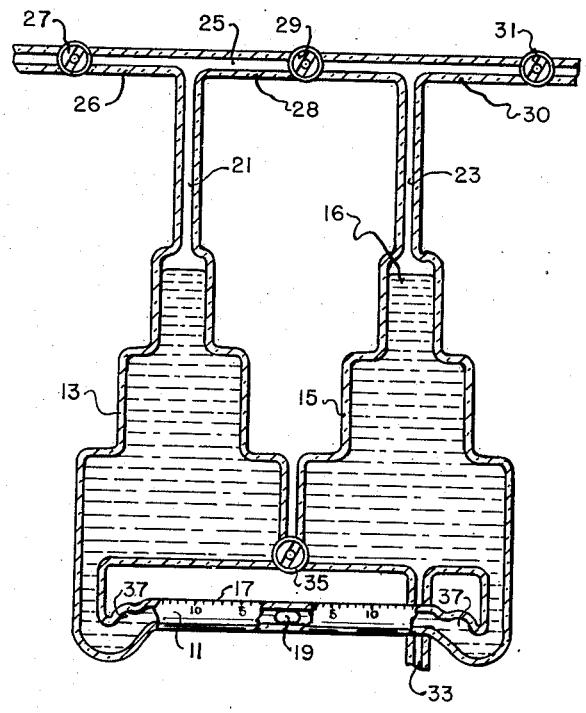
INVENTOR.
JEROME ROTHSTEIN
BY
*Harry M. Saragovitz*
Attorney Patented July 27, 1954

2,684,593

UNITED STATES PATENT OFFICE 2,684,593

PRESSURE GAUGE

Jerome Rothstein, Belmar, N. J., assignor to the United States of America as represented by the Secretary of the Army Application December 14, 1950, Serial No. 200,862

3 Claims. (Cl. 73—401)

(Granted under Title 35, U. S. Code (1952), sec. 266)

The invention described herein may be manufactured and used by or for the Government for governmental purposes, without the payment of any royalty thereon.

The present invention relates to a pressure gauge. More particularly, the invention relates to a pressure gauge which can function as a multi-range instrument whose sensitivity can be varied from that of a simple U-tube, suitable for high pressures, to that of a McLeod gauge, suitable for low pressures.

Heretofore, gauges of the McLeod type have been confined in the scope of their operation by being limited to intermittent pressure readings, by the failure to function accurately in the presence of condensable vapors, and by the limited range in which a particular gauge can be operated. Other types of gauges have also been devised which are provided with an index bubble, or equivalent device, which moves to show pressure differentials, but such devices are often limited to intermittent pressure readings, or may be further restricted to operate in specific limited ranges, or have limited sensitivity.

A pressure gauge, according to my invention, consists essentially of a pair of chambers, each of said chambers having bores of different successive diameters with means to vary the quantity or level of a registering liquid contained in said chambers so that readings may be taken at any desired diameter, in association with a horizontal capillary tube having an air bubble or other indicating means therein, linking said chambers.

Accordingly, it is an object to provide an improved bubble or equivalent indicator type pressure gauge that will be accurate and highly sensitive over a relatively large number of pressure ranges.

Another object of this invention is to provide a gauge than can serve as a continuous pressure indicator in any given range of pressure.

Other objects and advantages will be apparent from the following description with reference to the accompanying drawings, wherein, The figure is a vertical sectional view of a preferred form of my invention.

Said figure illustrates the general structural plan and underlying principle of my improved sensitive gauge wherein is shown a horizontally disposed transparent capillary tube 11, the ends of which open into vertical chambers 13, 15. For a determination of pressure readings, the tube 11 is provided with a scale 17, indicating the linear displacement within the tube of an air bubble 19.

The tube 11 and chambers 13, 15, contain mercury 16, or other suitable liquid. The bubble need not be air or other gas, as it may be a liquid that does not mix and is distinguishable from the liquid of the gauge.

The chambers 13, 15, terminate at their upper ends in capillary tubes 21, 23, respectively, which are in communication with a tube generally indicated as 25, one end of which is connected to a system to be measured, while the other end is connected to a vacuum pump (not shown) or other reference pressure. Tubing 25 is composed of three parts or sections designated 26, 28, 30, which, in the example shown, are comprised of a single length of tube wherein section 26 leads to the system to be measured, section 30 leads to a vacuum pump or other reference pressure, while section 28 connects the two capillary tubes 21 and 23. If desired, however, the three sections need not be a single tube, as shown, but can be made of separate sections each serving in the manner set forth. Within the sections 26, 28, 30, are stopcocks 27, 29 and 31, respectively. For supplying or removing mercury or other medium to and from the system, an opening is provided in the bottom of chamber 15, which opening has extending therefrom tube 33, which is connected to a reservoir or other source of mercury 16, or other liquid medium. By this means, the amount of liquid in the gauge can be readily controlled and varied, thereby fixing the liquid level and varying the sensitivity of the gauge, as hereinafter pointed out.

The chambers 13, 15, intercommunicate at their lower ends through a stopcock 35, which, when in open position, permits the flow of the liquid medium between said chambers.

To prevent loss of the bubble 19, a bubble trap 37 is provided at each end of the capillary tube 11. Each such trap 37 comprises a clearance space formed by having a slightly enlarged bore portion within the capillary tube 11, beyond which the tube extends downwardly and then upwardly into one of the chambers 13, 15. The chambers 13 and 15 are preferably of the same general configuration, and, as illustrated, preferably having successive steps to form successive bores of different diameters, so that, at similar levels, the cross-sectional areas of the chambers are alike. However, the gauge is operable by the same principles if one chamber only is as shown, the other being of arbitrary shape or, if desired, the stepwise variation in bore may be replaced by a continuous variation in diameter such as is formed by a conical chamber.

The operation of the gauge described above can be set forth briefly as follows. For simplicity, the operation will be described with the reference pressure substantially zero, as provided by a vacuum pump. Other examples and instances will be apparent to those skilled in the art. With the stopcock 27 in closed position, the section of tubing 26 is connected to the system to be measured, and tubing 30 is connected to the vacuum pump. Stopcocks 29 and 31 are then opened to evacuate the gauge and stopcock 35 opened to permit the flow of liquid medium from one chamber to the other to set the indicator bubble 19 in desired position. Liquid 16 is then introduced into or withdrawn from the gauge through tube 33 to the desired liquid level so that the gauge will operate in a particular range. The bubble 19 need not be dead-centered within the capillary 11, as in certain instances it might be desired to operate the gauge with the bubble at one end of the capillary, thereby increasing the scope of the measurement of linear travel of the bubble in one direction. Stopcocks 29 and 35 are then closed, and the system is ready for operation. The stopcock 27, in tube 26, leading to the system to be measured is then opened and any pressure differential will then be indicated by movement of the indicator bubble 19 in capillary 11, to be read in terms of linear displacement of the bubble, that is, the distance of travel of the bubble as shown by the scale.

In a particular example, if there is a flow of liquid from container 13 to container 15, whereby the amount of liquid in container 13 is lowered by a distance $h$, the volume of liquid flowing will be $h.A$, where A is the cross-sectional area of container 13. With stopcock 35 closed, the flow is through the capillary tube 11, having a cross-sectional area $a$, the bubble will be displaced a distance L; hence, $L.a = hA$, or $$L = h\frac{A}{a}$$

i. e., the difference in liquid level caused by the pressure to be measured is magnified in the ratio $A/a$ and this magnified displacement indicated by the bubble.

For purpose of illustration only, the capillary tube 11 may be of length D and have a cross-sectional diameter of 1 millimeter, while the tubes 13 and 15 have a cross-sectional diameter of 3.3 centimeters, and accordingly, $A/a$ is a factor of about 1000 which causes a relatively large displacement or movement of the air bubble upon registration of an extremely slight pressure differential.

It is clear from the above description that different ranges of sensitivity are obtainable for different values of the ratio $A/a$. For large values of the ratio, the sensitivity can be made comparable to that of the McLeod gauge, for unity ratio the instrument performs like a conventional U-tube. If A is made smaller than $a$, for example, by taking the bore of capillaries 21, 23, smaller than that of capillary 11, there is a reduction in sensitivity below that of a U-tube, which may be useful for measurements in the high pressure range. It is clear that this instrument can be read continuously in a given range, rather than sporadically as with the McLeod gauge. Also, change in range is easily accomplished by raising or lowering the liquid level in the chambers.

In case the reference pressure is not substantially zero, e. g., atmospheric pressure, the operation is substantially unchanged as apparent to those skilled in the art. It should be pointed out that chambers 13 and 15 may be provided with scales, and with stopcock 35 left open, system functions as a U-tube, whose indications measure the pressure difference. If stopcock 35 is closed, the instrument measures small deviations from this large value with very high sensitivity.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pressure gauge comprising a pair of liquid chambers, each of said chambers being defined by a connected series of bores of different diameters, a capillary tube connecting one end of one series of bores and one end of the other series of bores, liquid within said chamber and said capillary tube, said chamber having means to admit one pressure to the remaining end of the one series of bores on the said liquid, and means to admit another pressure to the remaining end of the other series of bores on the said liquid, said capillary tube including indicating means to indicate therein relatively small changes in position of the liquid in said tube due to differences in the pressure applied on the liquid, and valved conduit means connecting the said series of bores in the vicinity of the capillary tube, said conduit means permitting free, non-capillary flow of liquid between the chambers when the valve is open, whereby the position of the liquid in said chambers is a measure of relatively large difference in the said pressures when the valve in the conduit means is open.

2. A pressure gauge as in claim 1 wherein the said indicator means is a bubble in the capillary tube, and the bore diameters of the one series of bores are similar to the diameters of the other series of bores.

3. A pressure gauge comprising a pair of liquid chambers, each of said chambers being defined by a connected series of bores of different diameters, a capillary tube connecting one end of one series of bores and one end of the other series of bores, liquid within said chamber and said capillary tube, means for fixing the liquid level in the chamber comprising a tube extending from one of said chambers to a remote source of liquid supply whereby a predetermined level of liquid can be maintained in said chambers, said chambers having means to admit one pressure to the remaining end of the one series of bores on the said liquid, and means to admit another pressure to the remaining end of the other series of bores on the said liquid, said capillary tube including indicating means to indicate therein relatively small changes in position of the liquid in said tube due to differences in the pressure applied on the liquid, valved conduit means connecting the said series of bores in the vicinity of the capillary tube whereby when said valved means is closed, liquid will flow from one chamber to another through said capillary tube and a change in liquid level in said chamber due to an admitted pressure results in a displacement of said indicating means which is expressed by $$L = h\frac{A}{a}$$

wherein L is said displacement distance, $h$ is the change in the liquid level in the chamber, A is the cross-sectional area of the bore and $a$ is the cross-sectional area of the capillary tube.

References Cited in the file of this patent

UNITED STATES PATENTS

| Number | Name | Date |
|---|---|---|
| 2,105,127 | Petroe | Jan. 11, 1938 |
| 2,434,837 | Cornett | Jan. 20, 1948 |
| 2,509,327 | Young | May 30, 1950 |

FOREIGN PATENTS

| Number | Country | Date |
|---|---|---|
| 9,101 | Netherlands | Dec. 15, 1921 |